March 28, 1967    KENJI MATSUNOBU ET AL    3,311,514
METHOD FOR MANUFACTURING ELECTRICALLY INSULATED COILS
Filed Aug. 12, 1963
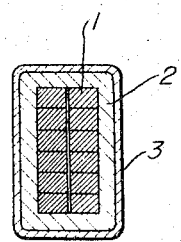
INVENTORS
KENJI MATSUNOBU
KAZUO OKA
BY: Paul M. Craig, Jr.
ATTORNEY 3,311,514
METHOD FOR MANUFACTURING ELECTRICALLY INSULATED COILS
Kenji Matsunobu and Kazuo Oka, Hitachi-shi, Japan, assignors to Hitachi, Ltd., Tokyo, Japan, a corporation of Japan
Filed Aug. 12, 1963, Ser. No. 301,453
Claims priority, application Japan, Sept. 7, 1962, 37/38,134
4 Claims. (Cl. 156—53)

The present invention relates to a method for manufacturing electrically insulated coils adapted for use in rotary electric machines.

Prior practices in the formation of electrical insulation for armature windings of rotary electric machines generally comprise the steps of winding electrically insulating materials such as mica tapes or glass tapes about conductors forming the armature windings, drying the insulated conductors in a vacuum atmosphere, impregnating the insulated conductors with chemical compounds, synthetic resins or like materials in a vacuum atmosphere and finally forming the coil elements into desired shapes. While such a process has been effective in providing good electrically insulating properties, difficulties have usually been encountered in its successful operation for providing electrical insulation thereby, and the most serious problem involved in the operation has been the necessity of using excessively large masses of equipment which includes tanks for drying and impregnating, vacuum pumps or other vacuum exhausting apparatus and the like. There have also been other drawbacks, for example, a large amount of varnish is required for successful impregnation. The varnishes for impregnation, being generally thermosetting resins, have a definite pot life and methods of application thereof are attended with difficult procedures, thus resulting in an extremely inefficient application of the varnishes.

Therefore, it is the primary object of the invention to provide a method of manufacturing electrically insulated coil elements which will obviate such difficulties of prior methods without the need of vast installations as mentioned above. By the method of the present invention, a 100 percent utilization of varnishes can be made without any loss incidental to the process and further man-hours required for the treatment can be reduced markedly.

According to the invention, there is provided a method of manufacturing electrically insulated coil elements characterized by the steps of covering conductors with one or more electrically insulating materials containing a moldable varnish, inserting said insulated coil element into a tube of synthetic resin, drying said coil element in a vacuum atmosphere while being enveloped in the tube, and forming under heat and pressure. If necessary, it is desirable to use a metal gauge or frame and the like inside of the tube.

There are other objects and particularities of the invention which will become obvious from the following description with reference to the accompanying drawing. The sole figure is a cross-sectional view showing the structure of an insulation of an electrically insulated coil element embodying the present invention.

In the sole figure of the invention, there is shown conductors 1 which are surrounded by an electrically insulating covering 2. The insulating covering 2 comprises a mica tape, a glass tape and the like wound about the conductors 1 in layers with a varnish applied between each superimposed layer of such tape, or a tape pre-treated with a semi-curing resin wound about the conductors 1 in layers. The insulated coil element thus formed is then inserted into a tube 3 of synthetic resin such as irradiated polyethylene, polyethylene terephthalate, polypropylene, polycarbonate, polyvinyl chloride, or like synthetic resin materials. Under this condition, the coil element can be completely isolated from the outside except for both ends thereof which still remain in the bare condition. Subsequently, both ends of the synthetic resin tube 3 are connected to a vacuum pump, which is then run in conjunction with heating of the coil element at a temperature of 80 to 100° C. to perform a vacuum drying treatment. This treatment is effective to easily eliminate any voil spaces within the enveloped coil element since the varnish contained in the insulating layers remains in a completely liquid or fluidized condition. At the completion of the vacuum drying treatment, the coil element is sealed at both ends of the tube envelope 3 and subjected to baking with the interior thereof held in a vacuum. The coil element is then formed in a conventional manner.

It will readily be understood that, according to the method of the invention, the process is extremely simplified as described in the foregoing and yet it is possible to attain the similar effect as is obtainable with the conventional process which includes the impregnation and pouring of varnish in a vacuum atmosphere. It should also be noted that, by the method of the invention, it is possible to reduce the amount of equipment and man-hours used below about one half of that generally required by the vacuum impregnation system of the prior art.

A preferred embodiment of the invention will now be described in more detail in the following.

Four layers of a mica tape, two layers of a glass tape, further four layers of the mica tape and further two layers of the glass tape are successively applied on the conductors 1 to form the electrically insulating covering 2. During this operation, the respective tapes are wound in a manner that the tape of each upper layer superimposes half of the width of the tape of each lower layer, and a varnish of epoxy resin having a pot life of about ten days is applied with a brush on each layer. By this process, the insulating covering 2 is sufficiently brushed with the varnish. The assembly comprising the conductors surrounded by the insulating covering is then inserted by suitable means into a tube 3 of irradiated polyethylene. Both ends of the tube 3 are subsequently connected to a vacuum pump so that a vacuum of the order of 0.1 mm. Hg prevails in the tube envelope. Under this condition, the entire assembly is subjected to vacuum drying for about 5 hours at a temperature of about 100° C.

After having been sufficiently dried, the coil element is sealed at both ends of the tube envelope and then molded while being heated under pressure. The coil element obtained by the above process is comparable to those manufactured by the troublesome and time-consuming process of the conventional methods which require vast installations. Further, the process of the invention is advantageous in that the varnish can be kept free from any contamination due to the fact that it is isolated from the outside by the tube of synthetic resin and no loss of the varnish will result by virtue of the unique method applied.

What is claimed is:
1. A method of manufacturing electrically insulated coil elements which comprises covering electrical conductors with electrically insulating materials containing a moldable varnish, inserting the resultant insulated conductors into a tube consisting essentially of synthetic resin, connecting the ends of said tube to an evacuating means, vacuum-drying said insulated conductors contained in said tube, sealing said ends of said tube, and forming said in- sulated conductors to the desired coil element structure by heat and pressure.

2. A method of manufacturing electrically insulated coil elements according to claim 1, wherein said electrically insulating materials comprise layers of tape.

3. A method of manufacturing electrically insulated coil elements according to claim 2, wherein said moldable varnish is applied to each layer of said tape at the time that the tape is wound about said conductors.

4. A method of manufacturing electrically insulated coil elements according to claim 2, wherein said tape is pretreated with said moldable varnish prior to the winding of the tape about said conductors.

References Cited by the Examiner
UNITED STATES PATENTS

| | | | |
|---|---|---|---|
| 2,305,903 | 12/1942 | Scott | 156—53 |
| 2,425,294 | 8/1947 | Morgan | 156—47 X |
| 3,033,727 | 5/1962 | Cram et al. | 156—53 X |
| 3,048,651 | 8/1962 | Howard et al. | 156—53 X |
| 3,050,787 | 8/1962 | Richardson et al. | 174—120 X |
| 3,117,900 | 1/1964 | Jones | 156—53 |

FOREIGN PATENTS 1,113,017  8/1961  Germany.

EARL M. BERGERT, *Primary Examiner.*
P. R. WYLIE, T. R. SAVOIE, *Assistant Examiners.*